TRANSDUCER ASSEMBLY FOR MAGNETIC RECORDERS

Filed Feb. 1, 1960

INVENTORS.
A. J. Pankratz
Robert M. Shoemaker

By G. W. Seevers
Attorney.

United States Patent Office 3,075,051

Patented Jan. 22, 1963

3,075,051
TRANSDUCER ASSEMBLY FOR MAGNETIC RECORDERS

A. J. Pankratz, La Canada, and Robert M. Shoemaker, Whittier, Calif., assignors to General Precision, Inc., a corporation of Delaware Filed Feb. 1, 1960, Ser. No. 5,694
2 Claims. (Cl. 179—100.2)

This invention relates to magnetic tape recording and reproducing systems and, more particularly, refers to arrangements for routing the traveling tape past the transducer heads in such systems.

It is essential that the traveling tape follow a path at close spacing from the transducer head. The spacing between the traveling tape and the transducer head may be, for example, .0003 inch. The problem is to maintain such close spacing without placing the tape under undue tension and without causing excessive wear on either the tape or the transducer head.

This problem is complicated by two difficulties. One difficulty is that a tape inevitably varies in thickness throughout its length. The variations in thickness may be within close manufacturing tolerances or may be much greater, for example at a splice in the tape. The second difficulty is that dust and other foreign particles commonly adhere to the traveling tape and in effect increase the thickness of the tape in a varying manner.

One prior art solution to this problem is to use a rotary backing member to hold the traveling tape at a predetermined spacing from the transducer head, for example the previously mentioned spacing of .0003 inch. One disadvantage of this arrangement is that the thickened portions of the tape are compressed between the transducer head and the rotary backing member. Another disadvantage is that foreign particles adhering to the tape are forced past the head under pressure with consequent serious abrasive effect on the head. There is, moreover, a third disadvantage in that the rotary backing member may run slightly out of round to press the traveling tape repeatedly against the transducer head.

An alternate prior art solution is to tension the traveling tape against a substantial peripheral area of the transducer head, the tape being partially wrapped around the head. One disadvantage is that the tape must be placed under relatively high tension to maintain effective contact with the head. A second and more serious disadvantage is the relatively great extent in the direction of tape travel of the area of mutual contact where foreign particles are confined under pressure between the traveling tape and the transducer head. The confining of the foreign particles under pressure results in rapid abrasion of both the tape and the transducer head.

The present invention meets the problem by a transducer assembly in which suitable backing means provides two fixed guide edges to contact one face of the traveling tape at two zones spaced apart along the path of the tape and a transducer head provides a third edge adjacent the opposite face of the traveling tape at a third zone intermediate the two zones. There is a substantial clearance space on the opposite side of the tape from each of the two guide edges of the backing means and on the opposite side of the tape from the edge of the transducer head.

With the two guide edges of the backing means and the third edge of the transducer head positioned to define a straight line that is slightly thicker than the normal or nominal thickness of the tape and with the tape tensioned against the two spaced guide edges of the backing means, the tape is normally guided along the straight line with the desired slight clearance between the tape and the transducer head. If, however, a portion of the tape is thicker than the defined straight line, or, in effect, is so thickened by adhering foreign particles, the thicker portion of the tape merely deviates slightly from the straight line to follow a slightly tortuous path through the three zones. The advantages of this arrangement are that the areas of contact are slight, the pressure of the tape against the edges is slight, and at no point is the tape subjected to a squeezing action between opposing surfaces.

An important feature of the preferred practice of the invention is the concept of directing a stream of air across the tape in the region of the three contact zones. The air stream removes foreign particles from the traveling tape and minimizes the accumulation of dust and other foreign particles adjacent the two guiding edges of the backing means and the associated edge of the transducer head.

The features and advantages of the invention may be understood from the following description taken with the accompanying drawing.

In the drawing, which is to be regarded as merely illustrative:

Figures 1, 2:
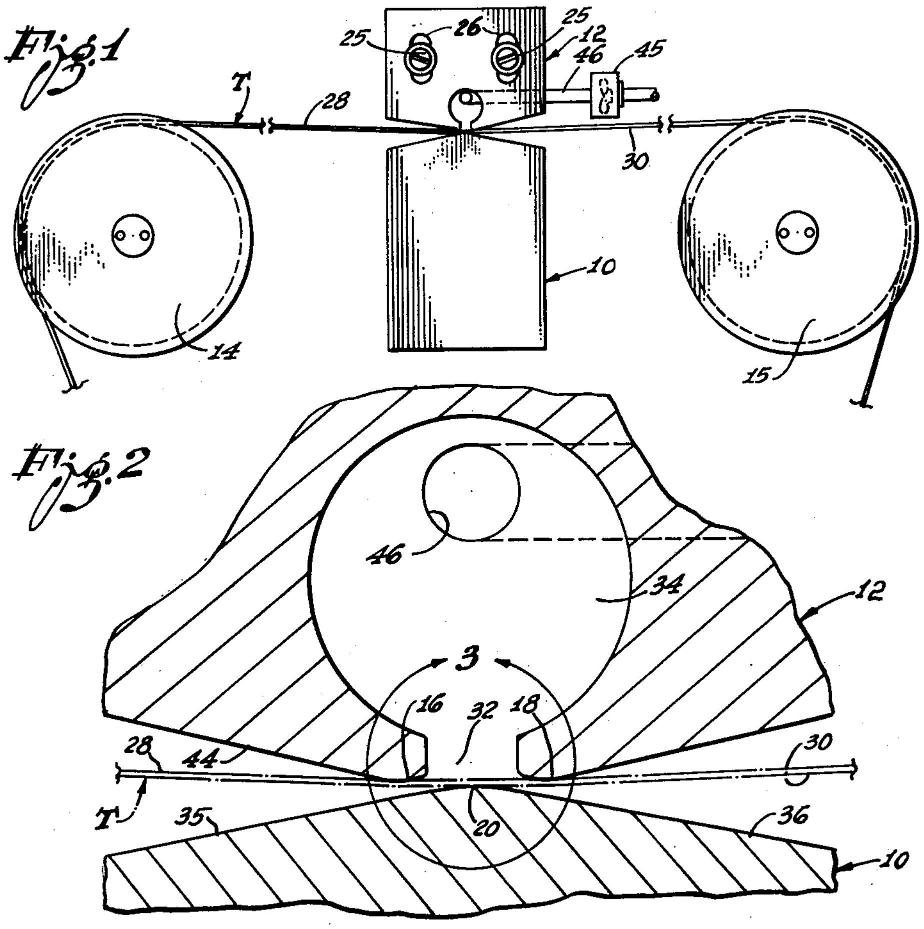
FIG. 1 is a simplified plan view illustrating a selected embodiment of the invention.
FIG. 2 is an enlarged fragmentary sectional view showing the manner in which the tape normally passed through the three zones.
Figure 3:
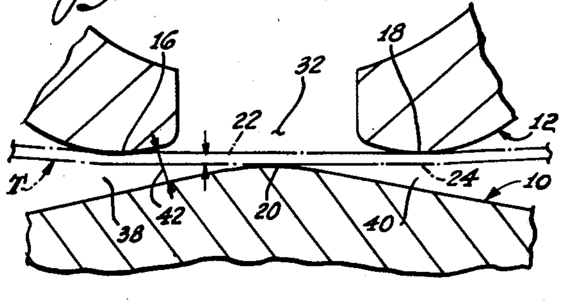
FIG. 3 is an enlargement of the portion of FIG. 2 that is indicated by the circle 3.

In FIGS. 1 to 3, illustrating the presently preferred embodiment of the invention, a magnetic recording tape, generally designated by the letter T, passes through a transducer assembly comprising a transducer head, generally designated 10, on one side of the traveling tape and a backing member, generally designated 12, on the other side. The tape T approaches the transducer assembly from a guide roller 14 and passes from the assembly to a second guide roller 15, the tape between the two guide rollers being under a desired degree of tension.

The backing member 12 is formed with a first guide edge 16 (FIG. 3) that is positioned transversely of the traveling tape and is at least as long as the width of the traveling tape. This guide edge 16 is positioned on one side of the path of the tape at what may be termed at first zone. The backing member further provides a second similar guide edge 18 on the same side of the tape at what may be termed a second zone. The transducer head 10 provides a third edge 20 on the opposite side of the path of the tape at a third zone that is intermediate the first and second zones with respect to the direction of travel of the tape.

As indicated in FIG. 3, the two guide edges 16 and 18, on the one hand, and the edge 20 of the transducer on the other hand define or conform to a thick straight line of the width indicated by the two parallel broken lines 22 and 24. In this embodiment of the invention, the two guide edges 16 and 18 are cylindrically curved with the broken line 22 tangential thereto and in like manner the edge 20 of the transducer head 10 is cylindrically curved with the broken line 24 tangential to its curvature.

The thickness of the thick line represented by the broken lines 22 and 24 may be varied by shifting either the transducer head 10 or the backing member 12. In the construction shown, the backing member 12 is adjustable relative to the transducer head 10 and for this purpose is anchored by a pair of screws 25 that engage parallel slots 26 in the backing member. It is contemplated that the thickness of the straight line to which the backing member is adjusted will be the nominal thickness of the tape T plus the desired normal gap between the traveling tape and the edge 20 of the transducer head. In this instance, the nominal thickness of the tape T is .0057 inch and the thickness of the line represented by the two broken lines 22 and 24 is .0060 to provide a normal gap of .0003 inch between the traveling tape and the edge 20 of the transducer head.

The path of approach of the traveling tape T to the first guide edge 16 is at a low angle relative to the broken line 22 and in FIGS. 1, 2 and 3, the path of departure of the traveling tape from the second guide edge 18 is also at a low angle. As a consequence of these angles, the tensioned tape hugs the two guide edges 16 and 18 to provide the desired normal clearance between the traveling tape and the edge 20 of the transducer head. In this instance, the approaching portion 28 of the traveling tape is at an angle of approximately one and one-half degrees from the line 22 and the departing portion 30 is also at an angle of about one and one-half degrees from the broken line 22. The low angle of approach is adequate to cause the tensioned tape to travel in a straight line between the two guide edges 16 and 18 but the angle is so low that the traveling tape exerts only light lateral pressure to cause wear on the two guide edges.

The backing member 12 is cut away to provide a clearance space between the two guide edges 16 and 18 on the opposite side of the traveling tape from the edge 20 of the transducer head and this clearance space communicates with an adjacent cylindrical passage 34 (FIG. 2) through the backing member. The transducer head 12 has two surfaces 35 and 36 that converge on the edge 20 of the transducer head, these two surfaces being at an angle to the broken line 24. This arrangement provides a clearance space 38 (FIG. 3) on the opposite side of the tape from the guide edge 16 and a second clearance space 40 on the opposite side of the traveling tape from the guide edge 18. Thus there is a clearance space on the opposite side of the tape from each of the three edges 16, 18 and 20 to permit a portion of the tape that is wider than .006 to travel a slightly tortuous path through the three zones.

Preferably there is clearance for a thickness as much as twice the nominal thickness of the tape to permit splices to pass through the transducer assembly. Thus the narrowest spacing between the backing member and the transducer head in the region of the two guide edges 16 and 18 is .012 inch, this minimum spacing being indicated by the transverse line 42 in FIG. 3.

As may be seen in FIG. 2, the surface 35 of the transducer 10 on the approach side of the transducer edge 20 is at a low angle relative to the path of the tape past the edge 20. In like manner, it can be seen that the backing member has a similar surface 44 which converges gradually on the guide edge 16 from the direction of approach of the traveling tape. The presence of the converging surface 35 tends to cause a film of air to exist between the traveling tape and the edge 20 of the transducer 10 even when a thickened portion of the tape is following a slightly tortuous path through the three zones. In like manner, the convergent surface 44 tends to cause a film of air to exist between the traveling tape and the guide edges 16 and 18. These films of air tend to be formed because boundary layer air tends to move with the tape and to be compressed against the tape by the convergent approach surfaces.

It is apparent that the path of all portions of the tape that are less than .006 inch thick will follow a straight line between the two guide edges 16 and 18 and that any portion of the tape that is thicker than .006 inch will follow a slightly tortuous path through the three zones. Normally the traveling tape tends to make only light contact with the edge 20 of the transducer 10, such tendency being caused by such factors as minute flutter, centrifugal force or slight bowing of the tape as it departs from the guide edge 16. Apparently the intervening film of air normally prevents actual contact of the traveling tape with the transducer edge 20. It is only when a thickened portion of the traveling tape passes through the three zones that there is any greater tendency for the tape to actually rub against the transducer edge 20.

As indicated diagrammatically in FIG. 1, a suitable fan or blower means 45 is connected to the cylindrical passage 34 by a duct 46 to draw a stream of air into the transducer assembly adjacent the clearance space 32 at sufficient velocity to remove lint and dust from the traveling tape as it passes through the three zones. This provision also keeps lint, dust and other foreign particles from accumulating on the surfaces of the backing member 12 adjacent the side edges 16 and 18 and on the surfaces of the transducer 10 adjacent the edge 20.

Figure 4:
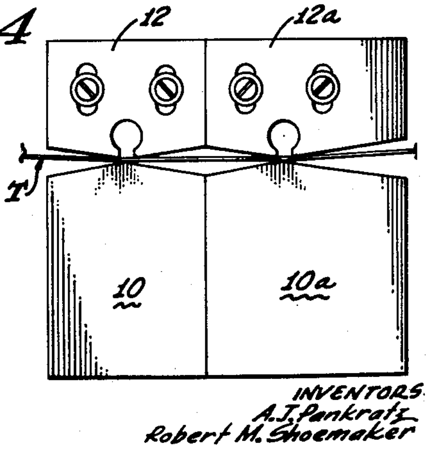
FIG. 4 is a plan view showing how a pair of transducer assemblies may be employed in tandem.

FIG. 4 shows how a transducer assembly may comprise two transducer heads 10 and 10*a* and two corresponding backing members 12 and 12*a*. The two pairs of guide edges of the two backing members 12 and 12*a* may conform to a straight line with the tensioned tape approaching the first guide edge of the backing member 12 at a low angle relative to the straight line and with the tape departing from the last guide edge of the backing member 12*a* at a low angle relative to the straight line.

Our description in specific detail of the selected embodiment of the invention will suggest various changes, substitutions and other departures from our disclosure within the spirit and scope of the appended claims.

What we claim is:

1. A transducer assembly for use with a traveling tensioned record tape including: a transducer member positioned on one side of the path of the record tape, a backing member positioned on the other side of the record tape in facing relationship with said transducer member, said backing member having a first cylindrically curved guide edge extending across the path of the record tape and a second cylindrically curved guide edge spaced along said path from said first guide edge and extending across said path, and said backing member being configured to provide a clearance space on said one side of said path between said first and second guide edges and to include at least one converging surface inclined to said path and extending to a corresponding one of said first and second guide edges, said transducer member having two oppositely inclined converging surfaces forming a third cylindrically curved guide edge extending across the path of said record tape on the opposite side of said path to said first and second guide edges and positioned opposite said clearance space between said first and second guide edges, said converging surfaces of said transducer member providing respective clearance spaces on said opposite side of said path positioned respectively opposite said first and second guide edges, and drive means for the tape positioned to tension the tape against said first and second guide edges of said backing member so as to provide a clearance between the tape and said third guide edge of said transducer member.

2. A transducer assembly for use with a travelling tensioned record tape, including: a transducer member positioned on one side of the path of the record tape, a backing member positioned on the other side of the record tape in facing relationship with said transducer member, said backing member having a passage therethrough and a first guide edge extending across the path of the record tape and a second guide edge spaced along said path from said first guide edge and likewise extending across said path, and said backing member having a configuration to provide a clearance space in open communication with said passage on said one side of said path between the first and second guide edges, said transducer member having two oppositely inclined converging surfaces forming a third guide edge extending across the path of said record tape on the opposite side of said path to said first and second guide edges and positioned opposite said clearance space between said first and second guide edges, said converging surfaces providing respective clearance spaces on said opposite side of said path positioned respectively opposite said first and second guide edges and blower means to direct a stream of air at the record tape so as to remove foreign matter therefrom.

References Cited in the file of this patent

UNITED STATES PATENTS

| | | |
|---|---|---|
| 2,476,599 | Haloski | July 19, 1949 |
| 2,551,845 | Lindsay | May 8, 1951 |
| 2,735,899 | Essel | Feb. 21, 1956 |
| 2,777,698 | Kurzeder | Jan. 15, 1957 |
| 2,864,893 | Gratian | Dec. 16, 1958 |
| 2,886,651 | Vogel | May 12, 1959 |
| 2,957,049 | Uritis | Oct. 18, 1960 |
| 2,962,558 | Hoshino | Nov. 29, 1960 |